Feb. 28, 1961 R. R. TEETOR 2,973,051
SPEED CONTROL DEVICE FOR AN AUTOMOTIVE VEHICLE
Filed Sept. 30, 1957 5 Sheets-Sheet 1
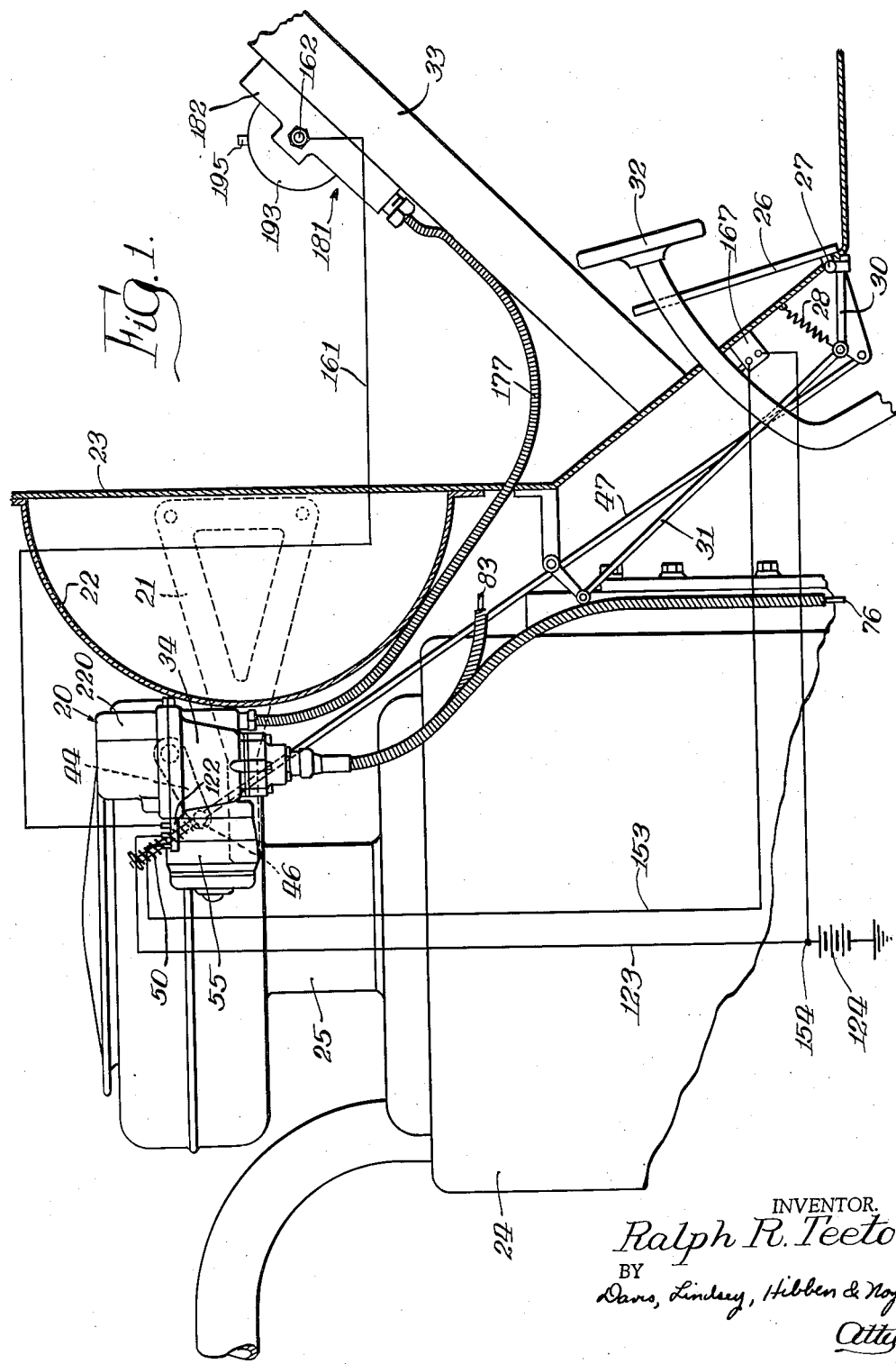
INVENTOR.
Ralph R. Teetor,
BY
Davis, Lindsey, Hibben & Noyes
Atty's.

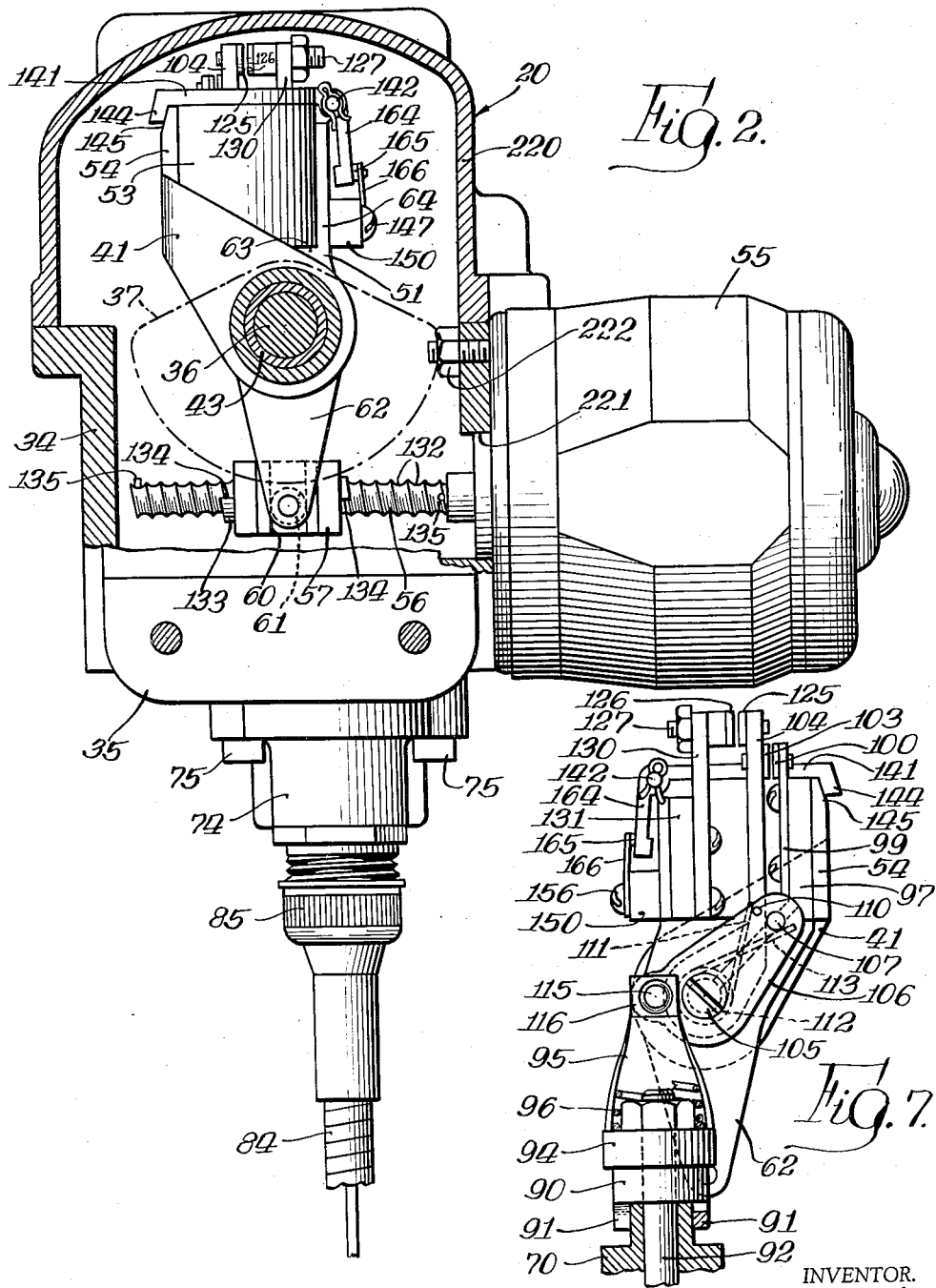

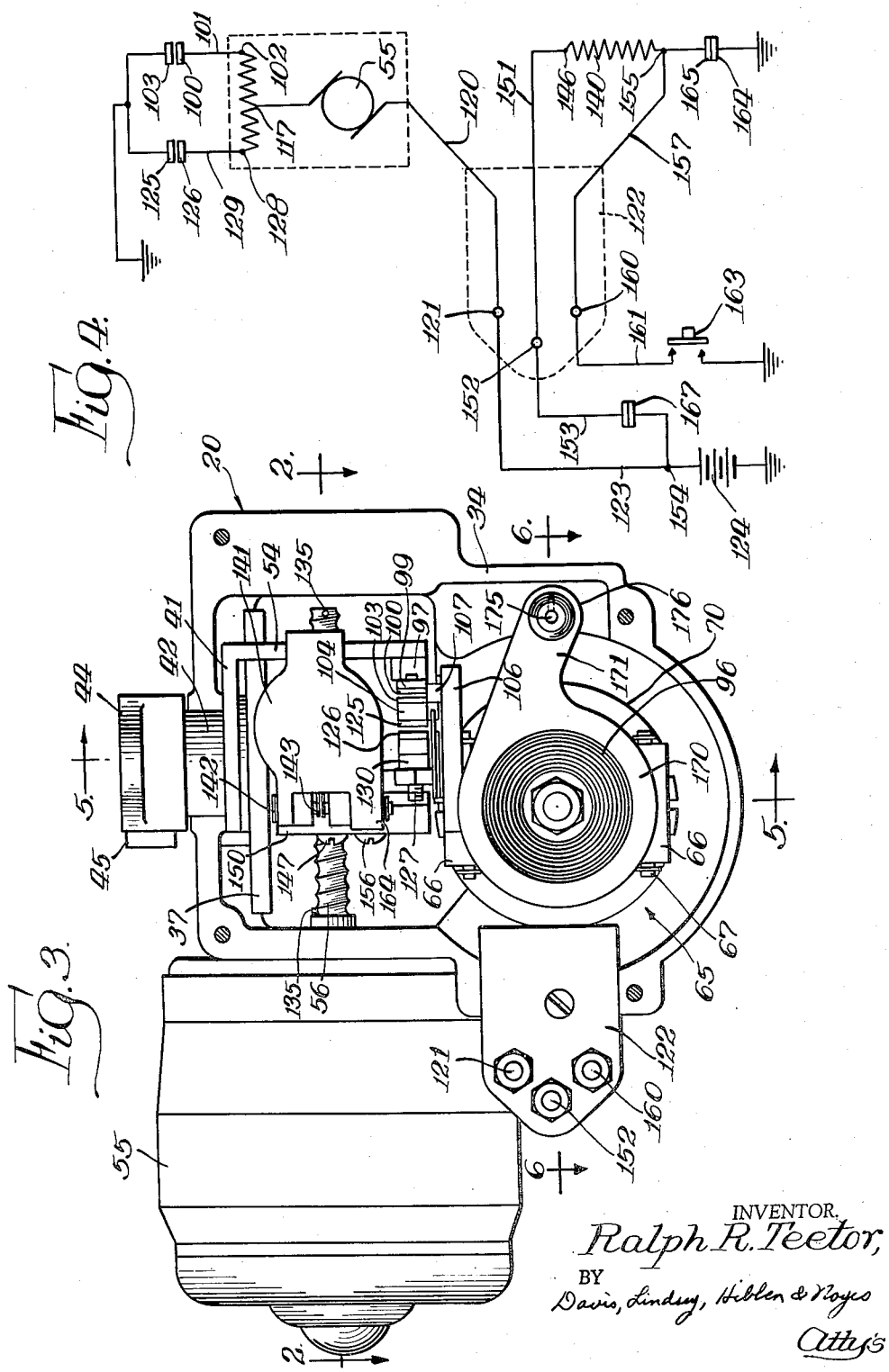

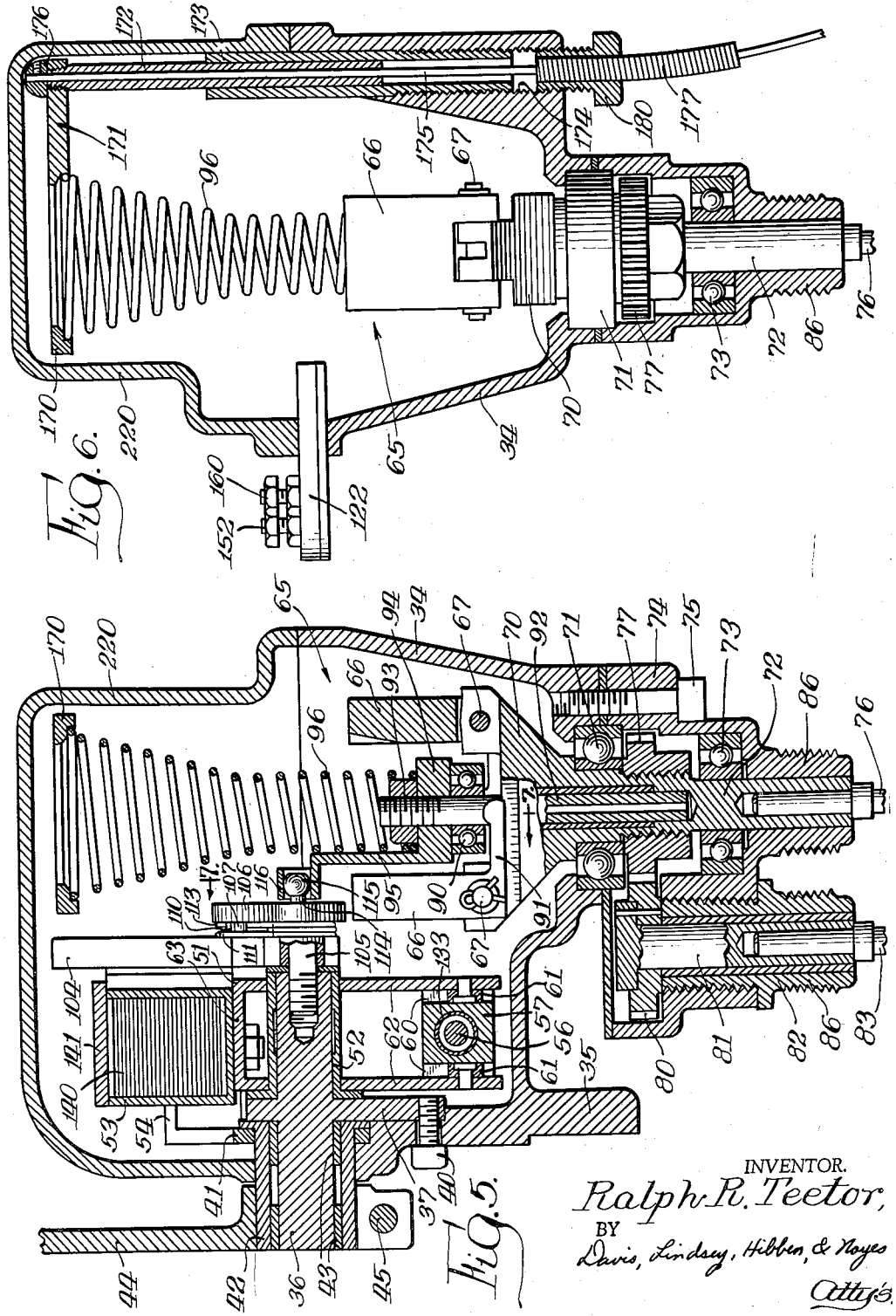

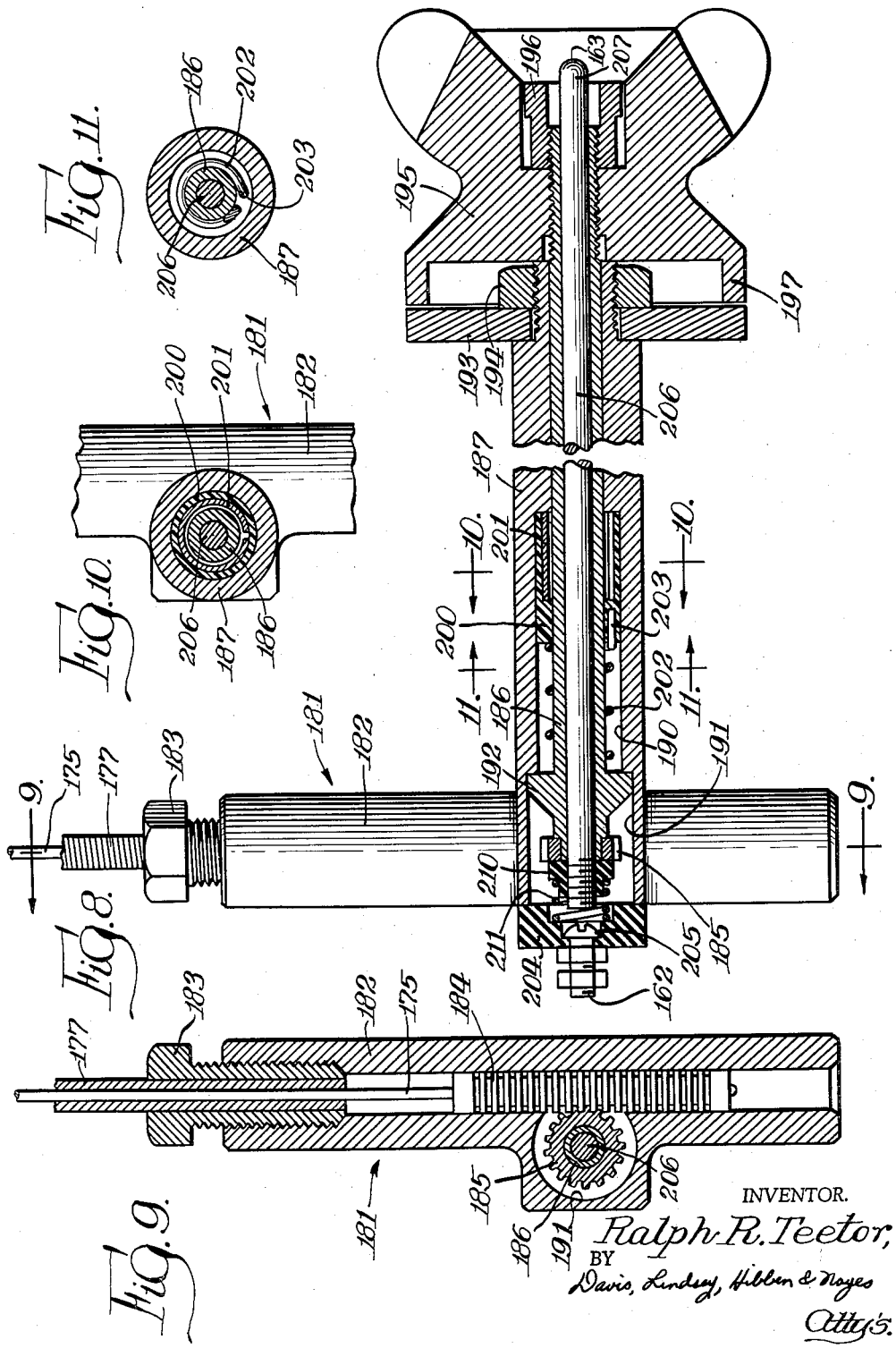

United States Patent Office 2,973,051
Patented Feb. 28, 1961

2,973,051

SPEED CONTROL DEVICE FOR AN AUTOMOTIVE VEHICLE

Ralph R. Teetor, Hagerstown, Ind., assignor to Perfect Circle Corporation, Hagerstown, Ind., a corporation of Indiana Filed Sept. 30, 1957, Ser. No. 686,817

35 Claims. (Cl. 180—82.1)

The invention relates generally to speed control devices and more particularly to a speed control device for an automotive vehicle.

The general object of the invention is to provide a novel speed control device which offers a resistance to advancing movement of the throttle control member of the engine of the vehicle when a predetermined vehicle speed is reached, the device being rugged in construction, reliable in operation and at the same time being capable of being readily manufactured.

Another object is to provide a device of the foregoing character, having novel means for holding the throttle control member at a position for operating the vehicle at such predetermined speed, when the driver so desires, the driver thus not being required to manipulate the throttle control member while the vehicle continues to be operated at the predetermined speed.

A further object is to provide a speed control device of the foregoing character, which utilizes an electric motor for effecting the various movements thereof, the motor being operated from the vehicle battery and the device being so constructed that a relatively small motor is required so that a minimum of current from the battery is required.

Other objects and advantages will become apparent from the following description taken in connection with the accompanying drawings in which:

Fig. 1 is a fragmentary longitudinal sectional view of an automotive vehicle provided with a speed control device embodying the features of the invention.

Fig. 2 is a vertical sectional view of the speed control device, taken on the line 2—2 of Fig. 3.

Fig. 3 is a plan view of the device with a cover portion removed.

Fig. 4 is a wiring diagram of the electrical circuits of the device.

Fig. 5 is a vertical sectional view of the device, taken on the line 5—5 of Fig. 3.

Fig. 6 is a vertical sectional view taken on the line 6—6 of Fig. 3.

Fig. 7 is a fragmentary vertical sectional view taken on the line 7—7 of Fig. 5.

Fig. 8 is a plan view of a manual control portion of the device.

Fig. 9 is a sectional view taken on the line 9—9 of Fig. 8.

Fig. 10 is a sectional view taken on the line 10—10 of Fig. 8.

Fig. 11 is a sectional view taken on the line 11—11 of Fig. 8.

In my copending application Serial No. 627,650, filed December 11, 1956, a speed control device is shown, which provides a resistance to advancing movement of a throttle control member, such as an accelerator pedal, of an automotive vehicle at a predetermined vehicle speed, the device also being capable, when the driver so desires, to hold the pedal in a position to maintain such speed. The device therein shown utilizes electrical means to accomplish these functions, the electrical means being operated from the vehicle battery which supplies substantially constant power. With that device, the resistance to advancing movement of the accelerator pedal may be overcome by the driver, the electrical means being such that it may be held against movement or may be forcibly operated in a reverse manner when the driver advances the accelerator pedal still further. Thus, the driver may hold the accelerator pedal at such position as will maintain the predetermined vehicle speed or may advance the accelerator pedal to exceed the predetermined speed if the need arises. When the device is utilized to hold the accelerator pedal in such position as to maintain the predetermined speed, the driver merely depresses the brake pedal of the vehicle a slight amount and the device is completely disabled so that the vehicle is under the control of the driver in the normal manner, the holding means remaining disabled, unless re-established by the driver, after the brake is released.

A device embodying the present invention functions generally in the same manner as the device shown in the above-mentioned copending application, but includes a number of changes in structure which improve the operation and reliability of the device. The present device comprises generally an operating member or element having a resilient connection, which normally does not yield, for connecting it to the throttle control member of the vehicle, the operating member thereby being movable with the throttle control member. To provide a resistance to advancing movement of the throttle control member when a predetermined vehicle speed has been reached, an actuating member is provided, which engages the operating member, the actuating member being power operated as by an electric motor connected to the vehicle battery. The motor is reversible and is energized for operation in a direction to bring the actuating member into engagement with the operating member to oppose advancing movement of the throttle control member. Such energization of the motor is effected by the extent of movement of the operating member and a member moved by a governor responsive to the speed of the vehicle.

The connection between the motor and the actuating member is of the screw and nut type in order to obtain the necessary speed reduction and power with the minimum number of parts. The screw and nut connection, in this instance, is of a character which involves very little loss of power and which avoids any jamming action, as in ordinary screw and nut devices, at its limits of travel. The screw and nut connection provides a non-yielding drive for the actuating member, providing resistance to further advancing movement of the accelerator pedal if the driver desires to maintain the predetermined speed. If the driver desires or in emergency needs to exceed such predetermined speed, the preloaded resilient connection between the operating member and the accelerator pedal permits the driver to advance it farther.

When the driver desires to have the throttle control member held in a position to maintain a predetermined speed, the actuating member is secured to the operating member by electrical means including a manually operable push button switch to establish the securing relation, such relation thereafter being self-maintained unless disabled by slight actuation of the brake pedal of the vehicle. With this arrangement, when the vehicle is moving at a speed below the desired speed, the motor is energized in one direction to move the actuating member and hence the throttle control member in an advancing direction. The speed of the vehicle will thus be increased and when the predetermined speed is attained, the motor is de-energized for such direction of rotation. If the vehicle exceeds the predetermined speed, the motor is reenergized for operation in the opposite direction to move the accelerator pedal back toward idle position. A constant vehicle speed, regardless of road conditions or inclination, will thus be maintained.

In the drawings, one embodiment of the invention is illustrated and in Fig. 1 it is shown as mounted on an automotive vehicle such as an automobile of usual construction. The device is arranged to be mounted under the hood of the vehicle adjacent the engine. Thus, the device is indicated generally at 20 and is shown as being mounted on a bracket 21 illustrated in this instance as attached to the side of the heater box 22, the latter extending forwardly from the fire wall 23 separating the space under the hood from the driver's compartment of the vehicle. In different makes of vehicles, the manner of mounting the device will differ slightly, depending upon the space available under the hood, and the manner of mounting herein illustrated is merely typical. The device 20 is preferably mounted adjacent the engine, indicated at 24, and the carburetor, a portion of which is shown at 25. The driver-operated throttle control member or accelerator pedal for the vehicle is shown at 26 and is illustrated as being pivotally supported at 27 and connected to a lever 30 having a link 31 for operating the usual throttle valve (not shown) of the carburetor 25. The accelerator pedal 26 is operable between an idle position and a fully open position and tends to return to idle position under the influence of a spring such as the spring 28. The brake pedal of the vehicle is indicated at 32 while the steering wheel post is shown at 33.

The construction of the device 20 is shown in detail in Figs. 2 to 11 and comprises a housing 34 having a mounting pad 35 (see Fig. 2) adapted to be secured to the bracket 21. Most of the movable parts of the device are supported on a stationary shaft 36 having a flange portion 37 (see Fig. 5) intermediate its ends secured to the interior of a wall of the housing 34, as by screws 40. Mounted on one end of the shaft 36 is a rotatable member or element 41 having a hub portion 42 rotatably supported on the shaft 36 by bushings 43 at one side of the flange portion 37. The hub portion 42 projects exteriorly of the housing 34, as shown in Fig. 5, and is adapted to receive the hub of a lever 44 clamped thereon as by a screw 45. The lever 44 is adapted to be connected to the throttle control member or accelerator pedal 26. In the present instance, the lever 44 is resiliently connected to the accelerator pedal 26 for reasons to be hereinafter described. Thus, the lever 44 at its free end is provided with an eye 46 slidably receiving a rod 47 (see Fig. 1). Between the eye 46 and a cross pin in the adjacent end of the rod 47 is a preloaded coiled spring 50. The other end of the rod is adapted to be connected to the lever 30 of the accelerator pedal 26. Since the spring 50 is preloaded, it does not yield during normal operation of the device.

As heretofore mentioned, the device is adapted to provide a resistance to advancing movement of the throttle control member or accelerator pedal when the vehicle reaches a predetermined speed, such speed being adjustable by the driver of the vehicle. In the present instance, the resistance is transmitted to the accelerator pedal from the rotatable operating member or lever 41. The resistance is provided by non-yielding means movable by electrical means in the form of a reversible electric motor. To this end, an actuating member or element 51 in the form of a lever is also rotatably mounted on the shaft 36 at the inner side of the flange portion 37 within the housing 34, the actuating member 51 being rotatably supported on the shaft 36 by a bushing 52. The actuating member 51 is provided with a cylindrical casing 53 enclosing an electromagnet, the purpose of which will be hereinafter described. The rotatable member 41 at its upper end is bent to provide a laterally extending portion or arm 54 parallel to the axis of the member 41 and adapted to engage the side of casing 53 on the actuating member 51.

The actuating member 51 is adapted to be moved by the electric motor, which is shown at 55 and is mounted on the exterior of the housing 34. To provide the desired speed reduction and power with a minimum number of parts and so that a relatively small motor may be used, the connection between the motor 55 and the actuating member 51 is of the screw and nut type. Thus the motor shaft is extended at one end and is in the form of a screw 56 (see Figs. 2 and 5) located within the housing 34. Mounted on the screw 56 is a nut 57 of rectilinear form, and the nut 57 is provided with grooves 60 on its opposite sides to receive rollers 61 carried on the lower ends of spaced arms 62 constituting part of the actuating member 51, the arms 62 being perforated to receive the bushing 52. The actuating member 51 is preferably formed from sheet metal, the arms 62 being bent downwardly from a central platform or seat portion 63 supporting the cylindrical casing 53, a wing portion 64 extending upwardly from and at right angle to the platform portion 63 along the casing 53.

The rotatable member 41 is adapted to be swung in a clockwise direction as viewed in Fig. 2, when the accelerator pedal 26 is advanced to open the throttle of the engine, and when the predetermined speed of the vehicle is attained, the motor 55 is adapted to be rotated in a direction to move the actuating member 51 in a counterclockwise direction into abutment with the rotatable member 41 and to swing the latter counterclockwise if necessary. Thus, the screw 56 will be rotated in such direction as to move the nut 57 to the right, as viewed in Fig. 2. The actuating member 51 will therefore be swung counterclockwise and the casing 53 carried by the actuating member will be moved into engagement with the laterally extending portion 54 of the rotatable member 41. Because of the screw and nut, the actuating member 51 will not yield when pressure is applied to the accelerator pedal.

Energization of the motor 55 to effect the foregoing at a predetermined vehicle speed is dependent on the movement of the rotatable member 41 and the movement of a governor, indicated generally at 65, mounted within the housing 34. In the present instance, the governor 65 is shown as comprising a pair of governor weights 66 (see Figs. 3 and 5) pivotally mounted at 67 on a rotatably driven head 70. The latter is rotatably supported by a bearing 71 mounted in the housing 34. The head 70 is provided with a downwardly extending stem 72 rotatably supported in a bearing 73 mounted in a gear casing 74 secured to the housing 34 as by screws 75. The lower end of the stem 72 is tubular to receive, in driving relation therewith, the end of a flexible drive cable 76. The latter is adapted to be connected to and driven by the transmission of the vehicle (not shown) in timed relation with the speed of the vehicle. Between the two bearings 71 and 73 a gear 77 is mounted on the stem 72 for rotation therewith, and the gear 77 meshes with another gear 80 carried on a stub shaft 81 journalled in a sleeve 82 threaded into the gear casing 74. The lower end of the stub shaft 81 is tubular, similarly to the stem 72, to receive, in driving relation therewith, the end of a flexible drive cable 83 adapted to be connected to the speedometer (not shown) of the vehicle. The drive cables 76 and 83 are adapted to be enclosed in flexible casings 84 (see Fig. 2) provided with threaded couplings 85 adapted to be secured to threaded bosses 86 formed respectively on the gear casing 74 and the sleeve 82. The governor 65 is thus responsive to the speed of the vehicle.

The governor weights 66, on being rotated by the head 70, tend to swing outwardly on their pivots 67, and the force of such outward movement is transmitted to the outer race of a bearing 90 (see Figs. 5 and 7) by inwardly extending arms 91 formed on the weights 66. The inner race of the bearing is secured on a shaft 92 mounted in the head 70 and held against rotation. Secured to the shaft 92 by a nut 93 is a hub 94 having an upwardly extending arm 95 at one side of the axis of rotation of the governor. Outward movement of the governor weights 66 is opposed by a trumpet-shaped spring 96 bearing against the hub 94.

As mentioned above, energization of the motor 55 to effect movement of the actuating member 51 in a counterclockwise direction as viewed in Fig. 2 is dependent on the movement of the rotatable member 41 and the action of the governor 65. Thus, a pair of contacts, respectively movable by the rotatable member 41 and the governor 65, are brought into engagement to energize the motor in the desired direction. As shown in the drawings, the laterally extending portion 54 of the rotatable member 41 extends beyond the cylindrical casing 53 and at its end carries an insulating block 97 (see Figs. 3 and 7). Mounted on the block 97 is a metal bar 99 carrying a contact 100 and connected by a wire 101, shown in the wiring diagram of Fig. 4, to one end 102 of the field winding of the motor 55.

The contact cooperating with the contact 100 and movable by the governor 65 is indicated at 103 and is carried on a metal arm or member 104 in the form of a lever swingably mounted on a screw 105 threaded into the end of the shaft 36. The contact 103 is thus grounded to the frame of the vehicle. In order to avoid chance of the two contacts 100 and 103 fusing together, the axis of the screw 105 on which the arm 104 swings is slightly eccentric to the axis of the shaft 36 on which the rotatable member 41 swings so that a relative movement between the contacts parallel to their contacting faces occurs during the swinging movement. The arm 104 is yieldably connected to a lever 106 mounted on the screw 105 and actuated by the arm 95 of the governor. Thus the lever 106 is provided with a laterally extending pin 107 engaging the side of the arm 104 so that the arm 104 will be swung counterclockwise, as viewed in Fig. 7, when the lever 106 swings counterclockwise. The lever 106 also is provided with a pin 110 adjacent the pin 107 for engagement by one end 111 of a torsion spring 112 wrapped around the screw 105 on which the lever 106 is pivoted. The other end 113 of the torsion spring engages the pin 107. Thus, when the lever 106 swings clockwise, as viewed in Fig. 7, the torsion spring 112 will swing the arm 104 in the same direction. When the contact 103 on the arm 104 engages the contact 100 on the rotatable member 41, further movement of the lever 106 merely causes the torsion spring to yield. The lever 106 is connected to the arm 95 of the governor, for actuation thereby, by a pin 114 mounted eccentrically on the lever 106 and rotatably carrying a ball 115 (see Figs. 5 and 7) received in a cage 116 formed on the upper end of the arm 95 of the governor.

With the foregoing structure, when the rotatable member 41 is swung counterclockwise, as viewed in Fig. 7, by advancing the accelerator pedal 26, the speed of the vehicle will increase. When the speed of the vehicle is such that the centrifugal force of the governor weights 66 overcomes the force exerted by the governor spring 96 and the weights swing outwardly, the arm 95 will be moved upwardly, thereby swinging the arm 104 clockwise to bring the contact 103 into engagement with the contact 100 carried by the rotatable member 41. The end 102 of the field winding of the motor 55 is thereby grounded as indicated in the wiring diagram of Fig. 4.

One side of the armature of the motor 55 is connected to a point 117 intermediate the ends of the field winding and the other side of the armature is connected by a wire 120 to a binding post 121 provided on a terminal block 122 extending externally of the housing 34 as shown in Figs. 3 and 6. The binding post 121 is connected by a wire 123 to one side of the vehicle battery, indicated at 124 in Figs. 1 and 4. The other side of the battery 124 is grounded to the vehicle frame, as is usual in automotive vehicles.

Thus, when the contacts 100 and 103 are brought into engagement by movement of the rotatable member 41 and the governor, the motor 55 will be energized for one direction of rotation. Such direction is that required to move the nut 57 to the right, as viewed in Fig. 2, and the actuating member 51 will be swung counterclockwise until the cylindrical casing 53 carried by the actuating member 51 engages the laterally extending portion 54 of the rotatable member 41. Continued movement of the actuating member 51 pushes the rotatable member 41 in a counterclockwise direction and, when such forced movement of the rotatable member 41 causes the contacts 100 and 103 to separate, the motor circuit is thereby opened and the motor stops. This occurs at the predetermined speed for which the device is set and, if the driver wishes to maintain such speed, he merely holds the accelerator pedal at the position where the rotatable member 41 abuts the casing 53 on the actuating member 51. The latter, because of its screw and nut connection with the motor, cannot be moved by pressure on the accelerator pedal, so that a resistance to advancing movement of the accelerator pedal is thereby established at the predetermined speed. If the driver of the vehicle wishes or needs in an emergency to exceed the speed at which such resistance occurs, the accelerator pedal 26 may be advanced farther, thus merely causing the spring 50 on the rod 47 to be compressed.

If the driver permits the accelerator pedal 26 to be moved toward idle position and the speed of the vehicle decreases, or if road conditions result in a decrease in vehicle speed, such decrease in speed is utilized to energize the motor 55 for rotation in the opposite direction. To this end, the arm 104 carries a second contact 125 (see Figs. 2, 3, 4 and 7) on its face opposite to that on which the contact 103 is mounted. The contact 125 is adapted to engage a contact 126 provided on the end of a screw 127 secured in the end of a metal bar 130 mounted on a block 131 of insulating material. The bar 130 is connected by a wire 129 (see Fig. 4) to the end 128 of the field winding of the motor 55, opposite to the end 102. The block 131 is secured to the wing portion 64 of the actuating member 51, so that the contact 126 moves with the actuating member. Thus, when the speed of the vehicle decreases, the governor 65 responds to such decrease in speed by causing the arm 95 to be moved downwardly and thereby swing the arm 104 counterclockwise, as viewed in Fig. 7, until the contact 125 engages the contact 126. The motor 55 is thus energized for rotation in the opposite direction to that heretofore described. The nut 57 is consequently caused to move to the left, as viewed in Fig. 2, and the actuating member 51 is swung clockwise out of engagement with the rotatable member 41. If the accelerator pedal is permitted to move to idle position and the speed of the vehicle correspondingly decreases, the nut 57 moves to the extreme outer end of the screw 56. If the speed of the vehicle decreases to some extent and then remains steady, the nut 57 will move to the left until the contact 125 moves out of engagement with the contact 126 and the motor circuit will thus be opened to stop the motor. The actuating member 51 will therefore remain in the position it occupies when the motor stops.

The screw and nut connection between the motor 55 and the actuating member 51 provides the necessary speed reduction and power so that a relatively small motor may be employed. In the present instance, the screw and nut connection is of a character which involves very little loss of power due to friction and which is automatically stopped at the limits of travel of the nut on the screw, the nut being prevented from jamming when it reaches such limits so that it may be easily reversed in travel. The screw and nut employed in the present device is of the character shown in the Russell Patent No. 2,446,393, issued August 3, 1948. Thus, the screw 56 is provided with helical threads formed by a helical groove of arcuate cross section, as indicated at 132 in Fig. 2. The nut 57 is provided in its bore with a plurality of circumferential grooves of the same arcuate cross section as the groove 132 and mounted in each circumferential groove and in the adjacent portion of the groove 132 is a ball. The balls for the respective circumferential grooves in the nut 57 are held in uniformly spaced relation to each other circumferentially of the nut by a thin walled sleeve or cage 133 projecting at its ends beyond the ends of the nut. The balls are thus held within the nut since they are free to roll in the circumferential grooves therein but cannot move lengthwise of the nut. The balls, however, roll in the helical groove 132 of the screw 56 on relative rotation between the screw and the nut, causing the nut to be moved longitudinally of the screw. Because of the balls and their rolling action between the nut and the screw, a relatively small amount of power is lost through friction, and with the reduction afforded by the screw and nut, a very small motor will serve. Moreover, because of the rolling action of the balls in the grooves of the screw and nut, a greater mechanical advantage is obtained than with a conventional type of screw and nut.

The screw 56 and nut 57 are also prevented from jamming at the limits of travel of the nut on the screw. In effecting travel of the nut, the balls roll in the helical groove 132 of the screw and to stop such travel of the nut, the balls are prevented from rolling in the helical groove of the screw without restricting their movement in the circumferential grooves of the nut. Since the cage 133 controls the position of the balls, it is only necessary to lock the cage 133 to the screw 56. To this end, the ends of the cage are formed on a helix of the same pitch as the groove 132 for one complete revolution and the ends of each helix are connected by an axially extending edge 134. At each end of the screw 56 is a radially extending pin 135 engageable by an edge 134 on the cage 133. The cage will thus be caused to rotate with the screw 56 and relative to the nut 57. Consequently the balls will no longer move along the helical groove 132 but they are free to roll in the circumferential grooves in the nut, permitting the screw to continue to rotate without effecting any longitudinal movement of the nut. No jamming of the nut occurs and on reversal of the direction of rotation of the screw 56, the edge 134 on the cage 133 is merely moved out of contact with the pin 135.

As heretofore mentioned, the device disclosed herein is constructed so that, when the driver desires, the accelerator pedal 26 may be held in such position that the vehicle will operate at a predetermined speed and the driver may then remove his foot from the accelerator pedal. For this purpose, the rotatable member 41 is adapted to be secured to the actuating member 51 so that the accelerator pedal will thus be actuated in response to the functioning of the motor 55. The rotatable member 41 is arranged to be secured to the actuating member 51 by manually controlled electrical means. Thus, an electromagnet or coil 140 (see Figs. 4 and 5) is mounted in the cylindrical casing 53 carried by the actuating member 51 with the axis of the coil perpendicular to the platform portion 63. Cooperating with the electromagnet 140 is an armature plate 141 overlying the end of the coil and hinged as at 142 on the upwardly extending wing portion 64 of the actuating member 51. A torsion spring 143 (see Fig. 3) is mounted on the hinge 142 and tends to swing the armature plate 141 away from the electromagnet. The free end of the armature plate 141 is provided with a hook portion 144 adapted to engage over the beveled upper edge 145 of the laterally extending portion 54 of the rotatable member 41. When the portion 54 is in engagement with the cylindrical casing 53 and the electromagnet 140 is energized, the armature plate 141 is drawn toward the electromagnet and the hook portion 144 engages over the beveled edge 145 to secure the rotatable member 41 and the actuating member 51 together. When the electromagnet is deenergized, the torsion spring 143 swings the armature plate 141 upwardly to disengage the hook portion 144 from the beveled edge 145.

Energization of the electromagnet 140 is manually controlled. Thus, one end 146 of the electromagnet (see Fig. 4) is connected to a screw 147 (see Fig. 3) carried on a block 150 mounted on the outer face of the wing portion 64 of the actuating member 51. The screw 147 in turn is connected by a wire 151 to a binding post 152 on the terminal block 122. The binding post 152 is connected by a wire 153 at 154 to the wire 123 which connects the motor armature to the battery 124. The other end 155 of the electromagnet 140 is adapted to be grounded to energize the electromagnet. For initially doing so, the end 155 is connected to a second screw 156 carried on the block 150. The screw 156 is connected by a wire 157 to a third binding post 160 on the terminal block 122. The binding post 160 is in turn connected by a wire 161 to a binding post 162 provided on a manually operable switch or push button 163 forming part of the device and adapted to be mounted on the steering post 33 of the vehicle and described in connection with the description of Figs. 8 to 11. The push button 163 is adapted to be grounded through the steering post.

When the electromagnet 140 is initially energized by pressing the push button 163 and the armature plate 141 is drawn into engagement with the electromagnet, a second switch is closed, as an incident to the movement of the armature plate, to maintaining the electromagnet energized so that the push button 163 may be released. To this end, the armature plate 141 is provided with an arm 164 extending downwardly generally parallel to the wing portion 64 of the actuating member 51. The arm 164 is adapted to engage a contact 165 provided on a prong 166 extending upwardly from the screw 156 which is connected to the end 155 of the electromagnet. The electromagnet 140 will thus remain energized after the push button 163 is released, since the electromagnet is then grounded through the armature plate 141.

With the electromagnet 140 energized and the rotatable member 41 secured to the actuating member 51, the vehicle will be maintained at the predetermined speed with the driver's foot removed from the accelerator pedal 26. If the vehicle should fall below the predetermined speed, the arm 104 will swing counterclockwise, as viewed in Fig. 7, and the contacts 125 and 126 will then engage to energize the motor 55 for rotation in a direction to swing the actuating member 51 and hence the rotatable member 41, since the two are secured together, in such direction as to advance the accelerator pedal 26 and thereby increase the speed of the vehicle. If the speed of the vehicle exceeds the predetermined speed, the contacts 100 and 103 will engage, causing the motor to be driven in the opposite direction and thereby decrease the speed of the vehicle. The space between the contacts 100 and 126, when the actuating member 51 and the rotatable member 41 are secured together, is such that the contacts on the arm 104 cannot both engage the contacts 100 and 126 at the same time. The arm 104 thus floats between the two sets of contacts, breaking one set before making the other set.

The accelerator pedal 26 is thus advanced and retracted, depending on road conditions. If the vehicle starts up a hill, the tendency to decrease the vehicle speed will be counteracted by automatically advancing the accelerator pedal. If the vehicle starts down a hill, the tendency toward increased speed will be counteracted by the accelerator pedal being automatically moved back toward idle position. The predetermined speed will thus be maintained with varying road conditions.

Should the driver wish to return the vehicle to normal control, as in the case where he may be varying the speed frequently or where an emergency arises, all that he needs to do is press the brake pedal 32 slightly. In most emergencies, one of the first things that a driver usually does is to apply the brake. Thus, the return of control to normal is accomplished as an incident to the driver's first action in an emergency. To this end, a switch 167 (see Figs. 1 and 4) is interposed in the wire 153 which connects the electromagnet 140 to the battery 124. The switch 167 is normally closed but is positioned adjacent the brake pedal 32 so that, when the latter is moved a slight amount, the switch 167 is opened. The electromagnet is thereby deenergized so that the rotatable member 41 is no longer secured to the actuating member 51. The driver is therefore free to manipulate the accelerator pedal 26 as he desires. Opening of the brake switch 167 does not, however, disable the motor 55, since the armature of the motor is connected directly to the battery 124 by the wire 123.

The vehicle speed at which resistance to advancing movement of the accelerator pedal 26 occurs and the speed at which the vehicle may be held, as hereinbefore described, is adjustable by the driver of the vehicle. Such adjustment is effected by varying the loading of the governor spring 96. Thus, while the lower end of the spring 96 bears against the hub 94 of the arm 95, the upper end of the spring is seated in a counterbored ring 170 (see Figs. 3, 5 and 6). The ring 170 is formed on an arm 171 secured to a tube 172 and the latter is vertically slidable in a guide sleeve 173 threaded into a bore 174 formed in the wall of housing 34. Movement of the tube 172 in the guide sleeve 173 thus varies the loading of the governor spring 96.

Movement of the tube 172 is effected by manually operable means convenient to the driver. To this end, a Bowden wire 175 extends through the tube 172 and has its end secured so that tension on the Bowden wire 175 will increase the load on the spring 96. Thus, the end of the Bowden wire 175 is secured as by a set screw to a nut 176 bearing against the end of the tube 172 and the adjacent portion of the arm 171. The Bowden wire 175 is enclosed in a flexible casing 177 having one end secured to the housing 34 by a clamping nut 180 threaded into the bore 174.

The Bowden wire 175 extends to a manually operable device indicated generally at 181 in Figs. 1 and 9 to 11, which is herein illustrated as being mounted on the steering post 33 of the vehicle. The device 181 may of course be mounted in other ways than that shown herein to suit the wishes of the vehicle designer. The device 181 is herein shown as comprising a tubular body 182 into which the Bowden wire 175 extends and in which the flexible casing 177 is secured by a clamping nut 183 similar to the nut 180. The end of the Bowden wire 175 extends into and is connected to an annular rack 184 slidably mounted in the tubular body 182. The rack 184 is adapted to be actuated by and meshes with a pinion 185 secured to the end of a tubular shaft 186 rotatably mounted in a tubular portion 187 extending at a right angle to the main portion of the body 182. The shaft 186 is journalled at its outer end in the tubular portion 187 while the latter is counterbored as at 190 intermediate its ends and is further counterbored as at 191 to a larger internal diameter adjacent the main body 182. The end of the shaft 186 in the counterbore 191 is reduced in size to receive the pinion 185 and is also provided with a flange 192 adapted to abut the shoulder formed by the difference in diameter of the two counterbores 190 and 191. The tubular portion 187 of the body is reduced and threaded at its outer end to receive a disc 193 and a clamping nut 194. The shaft 186 extends beyond the end of the tubular portion 187 and is threaded to receive a member adapted to be manually rotated, such as a winged member 195, and a locking nut 196. The winged member 195 is shown as being provided with a skirt 197 overlying the disc 193. Rotation of the winged member 195 thus adjusts the loading of the governor spring 96.

The loading of the governor spring 96 tends to cause rotation of the winged member 195 in a direction to reduce the loading of the governor spring and to oppose rotation of the winged member 195 in a direction to increase the loading of the governor spring. It is of course necessary that the winged member 195 be held in any position to which it is adjusted. It is also desirable to provide equal resistance to rotation of the winged member for both directions. To this end, a friction means is provided, which functions to add resistance to the winged member 195 when the latter is turned in a direction to reduce the loading of the governor spring but is inoperable when the winged member is turned in a direction to increase the loading of the spring.

In the present instance, the friction means comprises a sleeve 200, made of a plastic material such as nylon, and mounted on the shaft 186 and peripherally and frictionally engaging the counterbore 190 of the tubular portion 187. To increase its frictional engagement with the tubular portion 187, one end of the sleeve 200 is counterbored to receive a resilient expander in the form of a longitudinally split spring sleeve 201. The sleeve 200 is rotatable on the shaft 186 but is provided with one-way clutch means to connect it thereto. In the present instance, the clutch means comprises a coiled spring 202 having one end secured to the sleeve 200 as by bending the end at 203 and inserting it in a hole drilled endwise in the sleeve 200. The spring 202 is of such diameter that it normally tends to hug the shaft 186 and is wrapped in such direction that, when the winged member 195 is turned to reduce the loading of the governor spring 96, the spring 202 tends to become still more tightly wrapped on the shaft 186 and the friction sleeve 200 is thus connected to the shaft 186. The friction of the sleeve 200 thus counteracts the tendency of the governor spring to cause the winged member 195 to turn in that direction. When the winged member is turned in a direction to increase the loading of the governor spring, such direction of movement of the shaft 186 tends to unwind the spring 202 and thus free it from the shaft 186. The friction sleeve 200 is thus inoperable when the winged member 195 is turned in such direction. When the winged member has been adjusted to the desired point, the spring 202 grips the shaft 196 and the friction sleeve 200 thus holds the winged member in adjusted position.

As heretofore mentioned, the electromagnet 140 is adapted to be initially energized by a push button switch 163 forming part of the device 181 and having a binding post 162 to which the wire 161 is connected. The binding post 162, in the present instance, is mounted in an insulating block 204 (see Fig. 8) mounted on one end of the tubular portion 187 and closing the end of the counterbore 191 therein. The binding post 162 is in the form of a screw having its head 205 located in a cavity in the inner face of the block 204. Cooperating with the head 205 is a longitudinally movable rod 206 to form the push button, the right hand end of the rod 206 being rounded as at 207 and projecting beyond the lock nut 196 holding the winged member 195 in place. The rod 206 extends through the tubular shaft 186, and at its left end projects beyond the pinion 185 and is threaded to receive a nut 210 preferably of insulating material. Interposed between the nut 210 and a shoulder on the block 204 is a spring 211 tending to move the rod 206 to the right. The rod 206 is aligned with the head 205 of the binding post 162 and when the end 207 of the rod is pushed, the rod will engage the head 205 to ground the electromagnet 140 and thus energize it. When the electromagnet is thus energized, the engagement of the arm 164 with the contact 165 maintains the electromagnet energized as heretofore described and the rod 206 may be released to permit the spring 211 to move the rod out of engagement with the head 205 of the binding post 162.

It will be noted from the foregoing description and the drawings that the device is so constructed as to facilitate manufacture as well as any servicing that might become necessary. Thus, most of the operating parts of the device are included in three subassemblies located in or attached to the housing 34. The housing per se is open at the top for access to such subassemblies and is adapted to be closed by a removable cover 220. The three subassemblies comprise an actuating unit, a drive unit, and a governor unit, each of which may be more or less completely assembled before being placed in the housing.

The actuating unit comprises the shaft 36 with the rotable member 41, the actuating member 51, the governor lever 106, and parts carried by them, mounted on the shaft. These parts may be assembled together as a unit and the unit as a whole placed in the housing 34 with the flange portion 37 abutting and secured to the inner surface of the wall of the housing as shown in Fig. 5. The axis of the shaft 36 lies in the plane of separation of the housing 34 and its cover 220 so the actuating unit may be readily placed in the housing.

The drive unit comprises the motor 55, the screw 56 and the nut 57, all being assembled together before being secured to the housing. The screw and nut are inserted into the housing 34 through an opening 221 (see Fig. 2) in the lower part of the housing and the opening is closed by securing the motor 55 to the housing as by studs 222. When the nut 57 is positioned in the housing, the rollers 61 carried by the spaced arms 62 are placed in the grooves 60 in the nut.

The governor unit comprises the governor head 70, the governor weights 66 carried thereby, and the shaft 92 with the parts carried thereby. The governor unit may be placed in the housing with the stem 72 extending downwardly therefrom and this unit is connected to the actuating unit by placing the cage 116 of the arm 95 over the ball 116 carried by the governor lever 106. When the governor unit is in place in the housing, the gear 77 is mounted on the stem 72. The gear casing 74, together with the parts therein, is then secured to the housing 34 by the screws 75.

Thus, the various parts of the device may be put together as subassemblies and the latter then assembled in the housing 34.

I claim:

1. A speed control device for an automotive vehicle having a driver-operated throttle control member movable from an idle position, said device comprising an operating member having a resilient connection adapted to be connected to said control member for normally moving said operating member with said control member, means for moving said operating member toward idle position, rotary drive means, a screw and nut connection between said rotary drive means and said moving means for actuating said moving means by relative longitudinal movement of said screw and nut, and means responsive to the speed of the vehicle and the movement of said operating member for energizing said rotary drive means, thereby moving said operating member toward idle position, said screw and nut connection having means for terminating said longitudinal movement when said operating member has been moved substantially to idle position and said control member is held in a position, through the yielding of said resilient connection, such that the resultant vehicle speed maintains said rotary drive means energized.

2. A speed control device for an automotive vehicle having a driver-operated throttle control member movable from an idle position, said device comprising an operating member having a resilient connection adapted to be connected to said control member for normally moving said operating member with said control member, means for moving said operating member toward idle position, rotary drive means, a driving connection between said rotary drive means and said moving means for actuating said moving means, and means responsive to the speed of the vehicle and the movement of said operating member for energizing said rotary drive means, said driving connection comprising a screw and nut preventing said rotary drive means from being driven by advancing movement of said control member through said operating member and said moving means, and said resilient connection permitting said control member to be held in an advanced position when said moving means moves said operating member toward idle position and exerting a force tending to move said control member toward idle position when the latter is so held.

3. A speed control device for an automotive vehicle having a driver-operated throttle control member movable from an idle position, said device comprising an operating member having a resilient connection adapted to be connected to said control member for normally moving said operating member with said control member, means for moving said operating member toward idle position, rotary drive means, a screw and nut connection between said rotary drive means and said moving means for actuating said moving means by relative longitudinal movement of said screw and nut, and means responsive to the speed of the vehicle and the movement of said operating member for energizing said rotary drive means, thereby moving said operating member toward idle position and deenergizing said rotary drive means, said screw and nut connection resisting advancing movement of said operating member from the position to which it is moved by said moving means, said resilient connection permitting said control member to be advanced relative to said operating member to permit the vehicle to exceed the speed at which said rotary driving means is energized and exerting a force tending to move said control member toward idle position when the latter is so advanced.

4. A speed control device for an automotive vehicle having a driver-operated throttle control member movable from an idle position, said device comprising an operating member adapted to be connected to said control member for movement therewith, moving means engageable with said operating member for moving said operating member toward idle position, reversible rotary drive means, a driving connection between said drive means and said moving means for actuating said moving means, said driving connection comprising a screw and a nut for actuating said moving means by relative longitudinal movement of said screw and nut, means responsive to the speed of the vehicle and the movement of said operating member to energize said driving means in one direction to move said operating member toward idle position, and means responsive to the speed of the vehicle and the movement of said moving means to energize said driving means in the opposite direction to move said moving means out of engagement with said operating member.

5. A speed control device according to claim 4, in which said moving means is operable from a position remote from said operating member into engagement therewith when said operating member is moved from idle position and said drive means is energized in said one direction, and said moving means is operable back to said remote position when said operating member is moved by said control member to idle position and said drive means is energized in the opposite direction.

6. A speed control device for an automotive vehicle having a driver-operated throttle control member movable from an idle position, said device comprising an operating member adapted to be connected to said control member for movement therewith, an element engageable with said operating member for moving said operating member toward idle position, a reversible electric motor, a screw and nut connection between said motor and said element, a governor responsive to the speed of the vehicle and having a member movable thereby, a pair of contacts carried respectively by said operating member and said governor member and engageable for energizing said motor in a direction to move said element into engagement with said operating member and to move the latter toward idle position, and a pair of contacts carried respectively by said element and said governor member and engageable for energizing said motor in the opposite direction to move said element away from said operating member.

7. A speed control device for an automotive vehicle having a driver-operated throttle control member movable from an idle position, said device comprising an operating lever adapted to be connected to said control member for movement therewith, an actuating lever engageable with said operating lever for moving said operating lever toward idle position, reversible rotary drive means, a screw rotatable by said drive means, a nut mounted on said screw and connected to said actuating lever for swinging the latter, and a governor responsive to the speed of the vehicle and having a lever movable thereby, said operating lever and said governor lever having engageable means for energizing said drive means in one direction to move said actuating lever into engagement with said operating lever to move the latter toward idle position, said actuating lever and said governor lever having engageable means for energizing said drive means in the opposite direction to move said actuating lever away from said operating lever.

8. A speed control device according to claim 7, in which said operating lever has an arm extending parallel to the axis of the lever, and said actuating lever is mounted concentrically with said operating lever and has a portion engageable with said arm for moving said operating lever.

9. A speed control device according to claim 7, in which said actuating lever has a portion engageable with said operating lever, and another portion comprising a pair of spaced arms and said screw extends between said spaced arms with the nut mounted between the arms and having a pair of grooves in its sides, and said arms carry rollers mounted in said grooves.

10. A speed control device according to claim 7, in which said drive means comprises a reversible electric motor, and said operating lever and said actuating lever and said governor lever are mounted substantially concentrically, and said operating lever and said governor lever respectively carry contacts engageable for energizing said motor for said one direction to shift said nut along said screw and thereby move said operating lever toward idle position, and said actuating lever and said governor lever respectively carry contacts engageable for energizing said motor for said opposite direction to shift said nut oppositely along said screw and thereby move said operating lever away from said actuating lever.

11. A speed control device for an automotive vehicle having a driver-operated throttle control member movable between an idle position and a fully open position, said device comprising an operating element adapted to be connected to said control member for movement therewith, an actuating element engageable with said operating element for moving the latter, manually controlled means for securing said actuating element to said operating element, rotary drive means, a screw and nut connection between said drive means and said actuating element for effecting movement of the latter by relative longitudinal movement of said screw and nut, means responsive to the speed of the vehicle and the movement of said operating element for energizing said drive means for rotation in a direction to move said operating element toward idle position, and means responsive to the speed of the vehicle and the movement of said actuating element for energizing said drive means for rotation in the opposite direction to move said operating element away from idle position toward fully open position.

12. A speed control device according to claim 11, in which said screw and nut has means for terminating relative longitudinal movement therebetween when said operating element is moved substantially to idle position and when said operating element is moved substantially to fully open position.

13. A speed control device for an automotive vehicle having a driver-operated throttle control member movable between an idle position and a fully open position, said device comprising an operating element adapted to be connected to said control member for movement therewith, an actuating element engageable with said operating element for moving the latter, manually controlled means for securing said actuating element to said operating element, reversible drive means connected to said actuating element, and means responsive to the speed of the vehicle and the movement of said elements for selectively energizing said drive means for operation in a direction to move said operating element toward idle position and in the opposite direction to move said operating element toward fully open position, said manually controlled means comprising an electromagnetic coil carried by one of said elements, and an armature movably mounted on said one element and held in engagement with the other element when said coil is energized to secure said elements together.

14. A speed control device according to claim 13, in which said armature has a lip engageable over an edge of said other element to secure said elements together.

15. A speed control device according to claim 13, in which said armature is hinged at one side to said one element and has a lip at its opposite side engageable over an edge of said other element to secure said elements together.

16. A speed control device according to claim 13, in which a manually operable push button is provided for initially energizing said coil, and said armature has an arm movable into engagement with a contact mounted on said one element when said armature moves to maintain said coil energized.

17. A speed control device according to claim 14, in which said elements comprise concentrically mounted levers, said one element comprising a seat and a portion extending at a right angle to said seat, said coil being mounted adjacent said portion on said seat with its axis perpendicular thereto, said armature being hinged on said portion and overlying the end of said coil, a contact mounted on said portion, an arm extending from said armature generally parallel to said portion and engageable with said contact for maintaining said coil energized, and manually operable means for initially energizing said coil to swing said armature for securing said elements together and for engaging said arm with said contact.

18. A speed control device for an automotive vehicle having driver-operated throttle control and brake members, said control member being operable between idle and fully open positions, said device comprising an operating element adapted to be connected to said control member for movement therewith, reversible means operable in one direction for moving said operating element toward idle position, means operable when energized for securing said reversible means to said operating element for moving the latter toward open position when said reversible means is operated in the opposite direction, manually controlled means for energizing said securing means, and means responsive to operation of said brake member for deenergizing said securing means to render said reversible means inoperable to move said operating element toward open position, said reversible means remaining operable in said one direction, when said brake member is operated, to move said operating element toward idle position.

19. A speed control device for an automotive vehicle having a driver-operated throttle control member, said device comprising an operating element adapted to be moved in one direction by said control member on advancing movement of the latter, means for opposing movement of said element in said one direction, a governor responsive to the speed of the vehicle, and means operable by the governor at a predetermined vehicle speed for energizing said opposing means, said governor including a governor spring, and means for adjusting the tension of said spring to vary the speed at which said opposing means is energized, including a manually operable member and means for adding a resistance to movement of said manually operable member when moved in a direction to decrease the tension of said spring, said resistance adding means being inoperable when said manually operable member is moved in the opposite direction to increase the tension of said spring, whereby the resistance to movement of said manually operable member is substantially the same in both directions.

20. A speed control device according to claim 19, in which said spring adjusting means includes a longitudinally movable connection having a rack attached to its end, said manually operable member is rotatable and has a pinion operable thereby and meshing with said rack, and said resistance adding means engages said manually operable member.

21. In a speed control device for an automotive vehicle having a driver-operated throttle control member and said device comprises means for opposing movement of said control member including a governor responsive to the speed of the vehicle for rendering said means operable at a predetermined vehicle speed, said governor having a spring, the tension of which is adjustable to vary the speed at which said governor is operable to render said opposing means operable, means for adjusting the tension of said spring comprising a manually rotatable member, rotatable friction means, and a one-way clutch for connecting said friction means to said manually rotatable member when the latter is rotated in a direction to decrease the tension of said spring, said clutch permitting said rotatable member to be rotated free of said friction means when said rotatable member is rotated in the opposite direction to increase the tension of said spring, whereby the resistance to rotation of said rotatable member is substantially the same in both directions.

22. Structure according to claim 21 in which said manually rotatable member is mounted in a tubular casing, and said friction means comprises a plastic sleeve loosely mounted on said rotatable member and frictionally engaging the inner surface of said casing.

23. Structure according to claim 22 in which a resilient expander is mounted within said sleeve to expand said sleeve outwardly into frictional engagement with said casing.

24. Structure according to claim 22 in which said clutch comprises a coiled spring surrounding said rotatable member and having one end rigidly connected to said sleeve, said spring being wound in such direction that it tends to tighten on said rotatable member when the latter is rotated to decrease the tension of said governor spring to connect said sleeve thereto and tends to loosen on said rotatable member when the latter is rotated to increase the tension of said governor spring to free said sleeve from said rotatable member.

25. Structure according to claim 21, in which said friction means through said clutch tends to hold said manually rotatable member in adjusted position against the tension of said governor spring.

26. In a speed control device for an automotive vehicle having a driver-operated throttle control member movable in opposite directions and said device comprises means for moving said control member in one direction and having an electromagnetic coil for effecting a connection for moving said control member in the opposite direction, said means including a governor responsive to the speed of the vehicle for rendering said means operable at a predetermined vehicle speed, the governor being provided with a spring, the tension of which is adjustable to vary the speed at which said governor is operable to render said means operable, means for adjusting the tension of said spring comprising a manually rotatable tubular member, a manually operable longitudinally movable rod mounted in said tubular member, and switch means operable by longitudinal movement of said rod for energizing said electromagnetic coil.

27. A speed control device for an automotive vehicle having a driver-operated throttle control member, said device comprising a casing, an actuating unit mounted in said casing as a sub-assembly and comprising a shaft having means for securing the sub-assembly in said casing, an operating lever adapted to be connected to said control member and rotatably mounted on said shaft, an actuating lever rotatably mounted on said shaft and engageable with said operating lever for opposing advancing movement of said control member, and a governor lever rotatably mounted on said shaft, a drive unit comprising a motor mounted on the exterior of said casing, a reversible motor driven screw extending into said casing, and a nut mounted on said screw and connected to said actuating lever, said governor lever cooperating with said operating lever and said actuating lever for controlling the energization of said motor, and a governor unit mounted in said casing and connected to said governor lever.

28. A speed control device according to claim 27, in which said shaft has a flange secured to a wall of said casing to secure said sub-assembly in the casing.

29. A speed control device for an automotive vehicle having a driver-operated throttle control member, said device comprising a movable member having a connection for moving said movable member by said control member in one direction on advancing movement of the latter, non-yielding means including drive means and engageable with said movable member for positively moving said movable member in the opposite direction, and means including relatively movable parts respectively responsive to the speed of the vehicle and the movement of said movable member for energizing said drive means at a predetermined vehicle speed.

30. A speed control device according to claim 29, in which said connection is resilient to permit the driver to move said control member to an advanced position.

31. A speed control device according to claim 29, in which said non-yielding means includes an electric motor comprising said drive means, and a screw element and a nut element, one of said elements being driven by said motor and the other element effecting movement of said movable member in said opposite direction.

32. A speed control device according to claim 29, in which said means responsive to the speed of the vehicle and the movement of said movable member includes a third part movable relative to said speed responsive part and responsive to movement of said non-yielding means for energizing said drive means for moving it out of engagement with said movable member.

33. A speed control device according to claim 29, in which said last-mentioned means deenergizes said drive means on movement of said movable member by said drive means, and said drive means thereby provides resistance to movement of said movable member for holding said control member against advancing movement.

34. A speed control device for an automotive vehicle having a driver-operated throttle control member, said device comprising a movable member having a connection for moving said movable member by said control member in one direction on advancing movement of the latter, non-yielding means including drive means and engageable with said movable member for positively moving said movable member in the opposite direction, a governor responsive to the speed of the vehicle, a member movable by said governor, cooperating means on said members for energizing said drive means to move said movable member to a position for deenergizing said drive means and to move the control member to a position for maintaining a predetermined vehicle speed, whereby said control member may be held in its said position by the driver against the resistance of said drive means to maintain said predetermined vehicle speed.

35. A speed control device for an automotive vehicle having a driver-operated throttle control member movable from an idle position, said device comprising an operating member adapted to be connected to said control member for movement therewith, an actuating member engageable with said operating member for opposing advancing movement of said control member, a motor having a screw and nut connection with said actuating member, and means responsive to movement of said operating member and the speed of the vehicle for energizing said motor for operation in a direction to move said actuating member into engagement with said operating member to provide a resistance to advancing movement of said control member, said screw and nut connection preventing reverse operation of the motor by said control member and thereby permitting the driver to hold said control member against said resistance to maintain a predetermined vehicle speed.

References Cited in the file of this patent

UNITED STATES PATENTS

| | | |
|---|---|---|
| 2,014,854 | Lothrop | Sept. 17, 1935 |
| 2,313,505 | Benjamin | Mar. 9, 1943 |
| 2,446,393 | Russell | Aug. 3, 1948 |
| 2,649,300 | Launder | Aug. 18, 1953 |
| 2,661,071 | Hoener | Dec. 1, 1953 |
| 2,755,877 | Kelem | July 24, 1956 |
| 2,816,617 | Lee | Dec. 17, 1957 |
| 2,837,931 | Brundage | June 10, 1958 |

FOREIGN PATENTS

| | | |
|---|---|---|
| 1,115,974 | France | Jan. 23, 1956 |

(Corresponding to U.S. 2,897,906, Aug. 4, 1959)

| | | |
|---|---|---|
| 494,174 | Great Britain | Oct. 21, 1938 |